C. M. MICHENER & A. C. BAUMANN.
INDICATOR FOR AUTOMOBILES.
APPLICATION FILED JUNE 25, 1915.
1,207,194.
Patented Dec. 5, 1916.
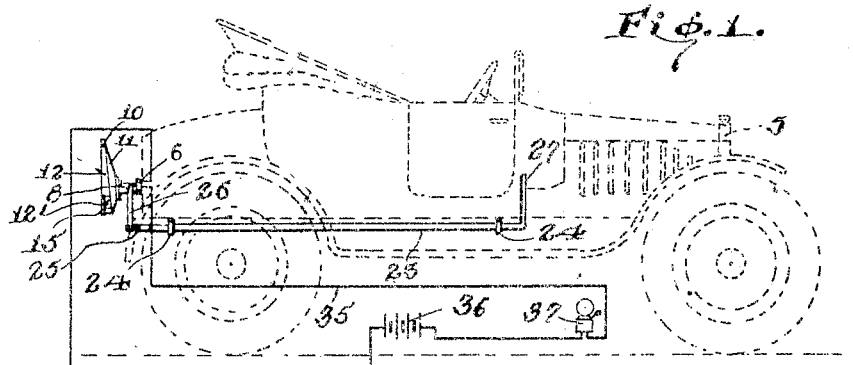
Witnesses
H. F. Costello
F. L. Ratcliffe
Inventors
A. C. Baumann
C. M. Michener
By Chandler & Chandler
Attorneys

UNITED STATES PATENT OFFICE.

CLARENCE M. MICHENER AND ARTHUR C. BAUMANN, OF NEW YORK, N. Y.

INDICATOR FOR AUTOMOBILES.

1,207,194.      Specification of Letters Patent.      Patented Dec. 5, 1916.

Application filed June 25, 1915. Serial No. 36,308.

*To all whom it may concern:*

Be it known that we, CLARENCE M. MICHENER and ARTHUR C. BAUMANN, citizens of the United States, residing at New York, in the county of New York, State of New York, have invented certain new and useful Improvements in Indicators for Automobiles; and we do hereby declare the following to be a full, clear, and exact description of the invention, such as will enable others skilled in the art to which it appertains to make and use the same.

This invention relates to new and useful improvements in indicators for automobiles and other vehicles to show in which direction the automobile is about to turn, and is particularly directed to the provision of such an indicator device which is provided with audible signal means which is operated upon operation of the indicator to indicate a turn.

It is the object in general of the present invention to simplify the structure and improve the efficiency and ease of operation of devices of this character, and is more specifically an object to provide a normally closed bell circuit which is held open by the operating crank of the indicator when the same is in a neutral position and which upon movement from said neutral position permits the circuit to close.

It is further an object to provide a simple and efficient connection between the indicator proper and its support whereby an electric lamp may be carried within the indicator in a manner rigid with respect to the support.

With the above and other objects and advantages in view, the invention resides more particularly in the novel combination, formation and arrangement of parts as more fully described hereinafter and pointed out in the appended claims.

Reference is had to the accompanying drawings, wherein similar characters of reference designate corresponding parts throughout the several views, and in which:

Figure 1 is a side elevation of an automobile structure showing the improved indicator apparatus attached thereto. Fig. 2 is a rear view of what is shown in Fig. 1. Fig. 3 is a detail sectional view on the line 3—3 of Fig. 2, taken through the indicator arm and the connection therefor. Fig. 4 is a sectional view taken through the same structure on the line 4—4 of Fig. 2. Fig. 5 is a detail perspective view showing the foot pedal for operating the indicator, and the means for holding the same. Fig. 6 is a detail view showing the cam end portion of the plunger member which engages the indicator operating means.

Referring now more particularly to the accompanying drawings, 5 designates generally the body of an automobile which is shown in a conventional manner.

The improved indicator includes a plate 5 which is secured on the back of an automobile and has an opening 7 provided therein into which is threaded a pipe section 8, which forms a bearing for the tubular supporting member 9 disposed therein. This tubular bearing member 8 is provided with a transverse slot 20, the purpose of which will be explained later. Threadedly connected to the outer end of this tubular supporting member 9 is an indicator arm 10. The bearing sleeve 9' is threadedly mounted upon the outer end of the tubular supporting member 9 to hold the outer end of the latter in spaced relation to the tubular bearing member 8.

The indicator arm 10 is in the form of a casing including the concaved back wall 11 which is in the shape of a wedge, the side walls 12 carrying at their free edges channels 13 for holding the triangular pane of glass 14. These channels terminate adjacent the head portion, which latter is substantially semi-circular in form. Pivotally connected to the opposite sides of the head is a semi-circular securing member 15 which is adapted to hold a pane of glass 16. This angular securing member is substantially right angular in cross section and is designed to have the flange 17 embrace the walls of the head and the flange 17' to bear against the pane of glass to hold the latter in position. The securing member 15 is held in place by a spring clip 18 of any conventional design. When it is desired to have access to the interior of the indicator arm, in order to get at the lamp 21 located therein, the securing member 15 is swung outwardly of the arm by its pivotal connection therewith and the semi-circular pane of glass 16 removed.

The tubular member 9 is held and operated by an arm 19, extending laterally therefrom through a transverse slot 20 in the pipe section 8, and to assemble this tubular member in the pipe it is reduced and threaded adjacent and outwardly of the slot. The sleeve 19' forming an integral part of the arm 19 is inserted through the slot 20 and a bearing sleeve 9' is inserted through the ends of the pipe and threaded onto the central section 9. The lamp 21 is preferably carried by a pipe section 22 disposed within the bore of the tubular member 9 and rigidly secured to the body portion of the automobile. When the indicator is in a vertically disposed neutral position, the arm 19 extends laterally in a horizontal plane.

For operating the indicator to swing either to the right or to the left to indicate the direction of turn a rod 23 is journaled longitudinally in bearings 24 on the bottom of the vehicle and has its rear end laterally directed at 25 and pivotally connected to a link 26 which is pivoted to the arm. The forward end of the rod 23 is directed upwardly at 27 through the bottom of the vehicle body in position to be actuated by the foot of the driver to swing it to either side and thus swing the indicator. For holding this portion 27 in a vertical position to hold the indicator neutral, a leaf spring 28 is secured to the adjacent portion of the dash or any other desired support and has portions thereof bowed outwardly at 29 to yieldingly engage the sides of the portion 27 and hold it against accidental actuation. It is not desired to limit the operating means for the rod 23 to this specific construction, as it is obvious that if desired suitable means could be provided adjacent the seat for rocking the rod.

The audible signal means operative when the signal is moved from neutral includes a plunger 30 slidably passed through a plate 31 carried by the main securing plate 6 adjacent the arm 19 when it is horizontal and this plunger is disposed in an insulating cylinder 32 carried by the plate and including a conducting end portion 33. The plunger is normally urged outwardly with respect to this cylinder to engage lugs 34 carried thereby with the end portion 33 to complete a circuit. This circuit includes wires 35 and 35' connected to the plate 31 and the end portion 33 respectively and to batteries 36 and a bell 37.

In the operation, the indicator in neutral position has its arm 19 normally disposed over and pressing the plunger inwardly to hold the circuit open. Upon moving the arm to actuate the indicator the circuit is closed by releasing the plunger and is not thrown open until the arm resumes a neutral position. To facilitate the engagement of the plunger by the arm an arcuate plate 38 is carried by its outer end to provide a cam action.

A comparatively simple device has thus been provided which will efficiently perform the functions set forth and wherein actuation of the audible circuit is directly dependent upon actuation of the indicator to lessen any possibility of errors due to failure of certain parts of the mechanism.

While we have illustrated and described a particular embodiment of our invention, we have merely done so for the sake of convenience and we do not wish to be limited to that particular embodiment as it is obvious that numerous changes may be made within the details of construction thereof without in any way departing from the spirit of the invention or exceeding the scope of the appended claims.

What we claim is:—

1. An indicator device comprising an attaching member including a tubular bearing member provided with a transverse slot, a tubular supporting member disposed in the bearing member, an operating arm mounted upon the tubular supporting member to extend through said slot, a bearing sleeve mounted on the outer end of the tubular supporting member within the bearing member, an indicator arm carried by the outer free end of the supporting member, and means connected to the operating arm for operating the same.

2. In an indicator device of the class described, the combination with an attaching member including a tubular bearing member provided with a transverse slot, a tubular supporting member disposed in the bearing member, an indicator arm carried by the outer free end of the supporting member, an operating arm mounted upon the tubular supporting member and extending through said slot, and means for operating said arm, of a push button mounted in the attaching member and extending out into the path of movement of the operating arm and adapted to be operated by the said arm during its indicating movement, and an auxiliary indicator connected to said push button and adapted to be operated simultaneously upon the operation of the indicator arm.

In testimony whereof, we affix our signatures in the presence of two witnesses.

CLARENCE M. MICHENER.
ARTHUR C. BAUMANN.

Witnesses:
T. A. MURRAY,
WALTER PHILLIPS.